Sept. 29, 1959 R. W. FLINT 2,906,482

RADIO CHASSIS, OR THE LIKE

Filed Nov. 5, 1953 2 Sheets-Sheet 1

INVENTOR.
RINARD W. FLINT,
BY
Wm. H. Maxwell Jr.
AGENT.

RADIO CHASSIS, OR THE LIKE

Filed Nov. 5, 1953 2 Sheets-Sheet 2

INVENTOR.
RINARD W. FLINT,
BY
Wm. H. Maxwell Jr.
AGENT.

United States Patent Office 2,906,482
Patented Sept. 29, 1959

2,906,482

RADIO CHASSIS, OR THE LIKE

Rinard W. Flint, Burbank, Calif., assignor to U M & F Manufacturing Corporation, Burbank, Calif., a corporation of California Application November 5, 1953, Serial No. 390,333

10 Claims. (Cl. 248—163)

This invention relates to a radio chassis, or the like, and it is a general object of the present invention to provide a chassis or frame for radio apparatus involving a plurality of mechanically related elements which are advantageously related to one another to be particularly applicable to electronic devices.

It is common in the field of electronics to take a ready-made chassis, or frame, and build upon it a permanent radio or electronic circuit, or a "breadboard" model or prototype. It is an object of this invention to provide for improved selection of various shapes, sizes and configurations of chassis. This invention provides for a universal chassis construction having great flexibility and almost unlimited possibilities in building a chassis of any desired size and shape.

It is an object of the invention to provide a chassis which is easy to manufacture, assemble and use in electronic work. In the chassis of the present invention the elements are of simple construction and are easily assembled, with the result that the structure as a whole is practical.

It is another object of the invention to provide a construction of the general character referred to wherein all of the elements can be manufactured in a manner to be complete and ready for assembly. That is, all of the elements are finished parts and are coordinated so that it is merely necessary to assemble them with a minimum of effort and care and without the use of special tools.

It is another object of the present invention to provide a radio chassis construction, or the like, which can be easily wired. With the present invention a panel is provided, which panel can be wired prior to installation upon the other chassis parts.

It is a further object of the present invention to provide chassis or frame elements of the character referred to which may be assembled in the chassis of varied depth or height, that is, the elements may be assembled one over another so that large components may be mounted beneath the panel as well as on the top.

It is an object of the present invention to provide a chassis or frame of the character referred to which is sturdy and of rugged construction. It is a feature of the present invention that the side rails of the chassis may be of one gauge material while the panel, or top, and the bottom may be of another gauge or heavier material, as circumstances require.

Figures 1, 2, 3, 4, 5, 6, 7, 8:
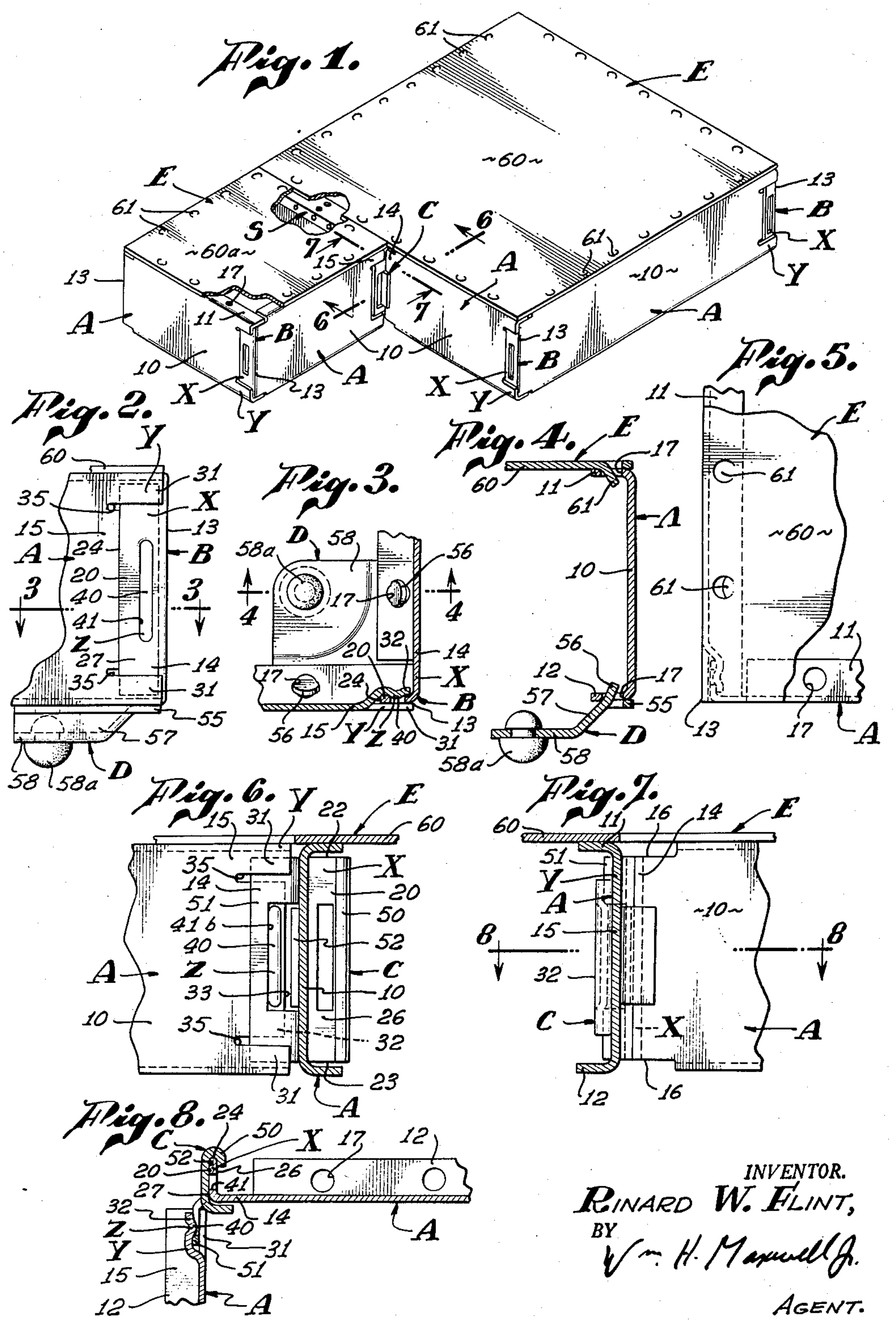

In the chassis or frame as provided by the invention there are like rails having male and female end portions, and coupling means are provided for coupling or joining the end portions of the rails. The coupling means of each rail involves, generally, a tongue or projection at the male portion of the rail and a receiver at the female portion of the rail. Retaining means are provided at the couplings for locking the rails together. The present invention is concerned primarily with polygonal chassis or frames wherein there are usually four corners, that is, outside corners of 90 degrees. However, it is contemplated by the present invention that one or more of the corners or sides may be recessed as shown in Fig. 1 of the drawings, in which case there would be one or more inside corners. Therefore, the present invention includes a corner adapter for changing the angular relationship of the rails, so that an inside corner may be provided in addition to the ordinary outside corner.

The present invention contemplates the use of the rails for building up the peripheral or marginal portion of the chassis or frame, and also contemplates the use of a top panel, and a bottom panel where circumstances require. The panels may be simple rectangular sheets of metal or phenolic, or the like, and may be provided at their marginal portions with suitable uniformly spaced fasteners or deflectable tabs, or the like. The tabs are adapted to be deflected into registering openings in the rails. Suitable legs are also provided for supporting the corners of the frame.

Figures 9, 10, 11, 12, 15:
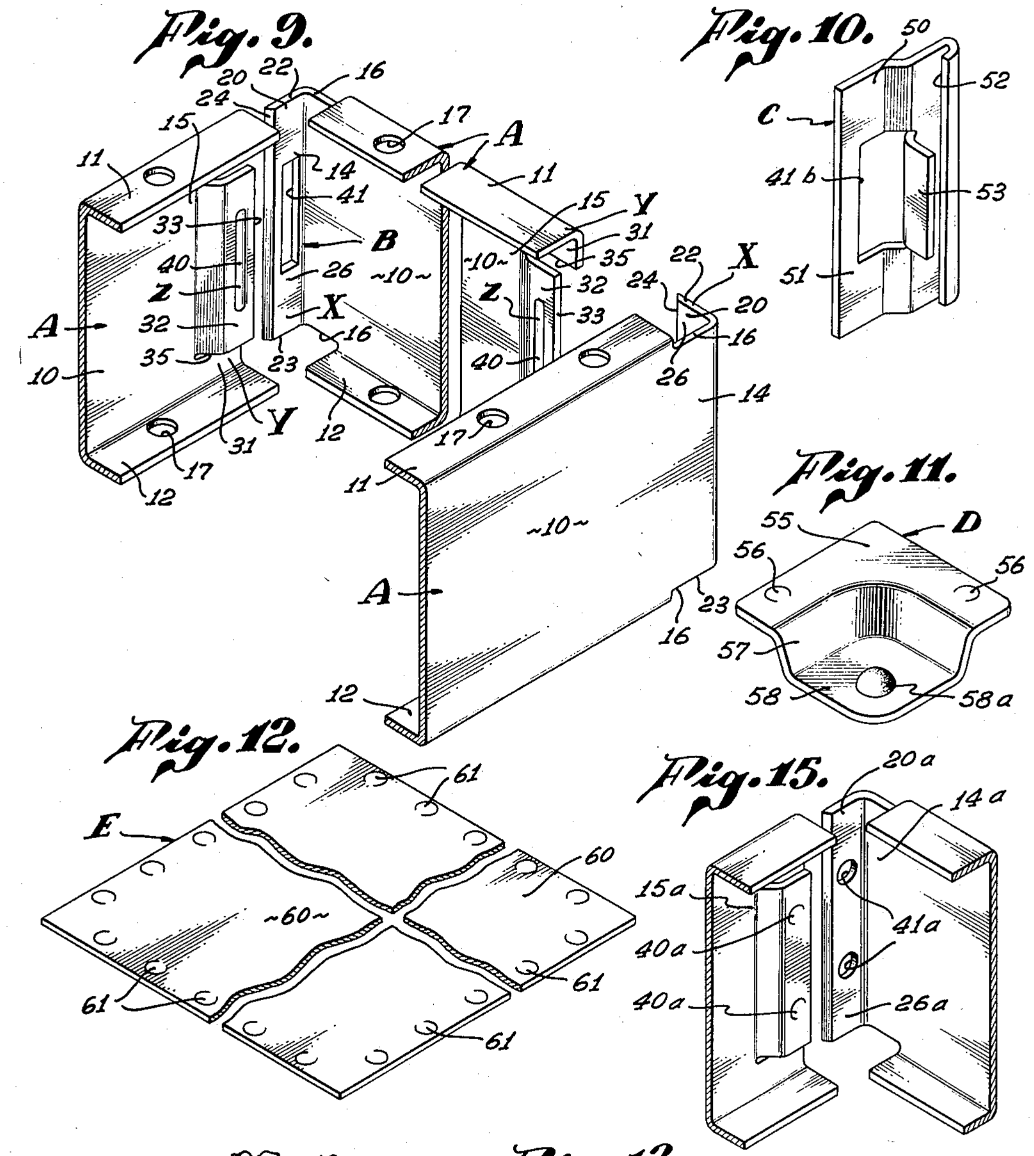
Figure 14:
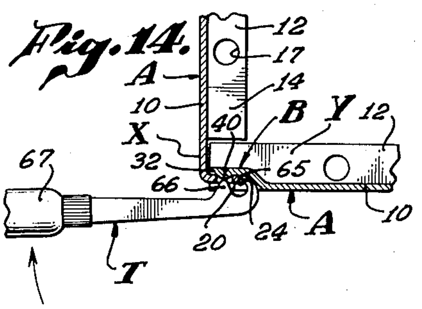
Figure 13:
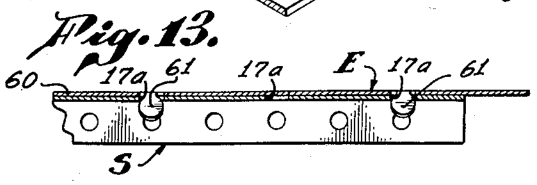

The various objects and features of this invention will be fully understood from the following detailed description of typical preferred forms and applications of the invention, throughout which description reference is made to the accompanying drawings, in which:

Fig. 1 is a perspective view of the frame or chassis of the present invention. Fig. 2 is an enlarged view of a portion of the structure shown in Fig. 1. Fig. 3 is a detailed sectional view taken as indicated by line 3—3 on Fig. 2. Fig. 4 is a detailed sectional view taken as indicated by line 4—4 on Fig. 3. Fig. 5 is an enlarged plan view of a portion of the structure shown in Fig. 1. Fig. 6 is an enlarged detailed sectional view taken as indicated by line 6—6 on Fig. 1. Fig. 7 is an enlarged detailed sectional view taken as indicated by line 7—7 on Fig. 1. Fig. 8 is a detailed sectional view taken as indicated by line 8—8 on Fig. 7. Fig. 9 is an enlarged detailed exploded perspective view of certain of the parts shown in Fig. 1. Fig. 10 is an enlarged detailed perspective view of the adapter provided by the present invention. Fig. 11 is an enlarged perspective view of the leg or support provided by the present invention. Fig. 12 is a perspective view of the panel provided by the present invention. Fig. 13 is an enlarged detailed sectional view of a portion of the structure shown in Fig. 1, and Fig. 14 is an enlarged detailed sectional view of the joint or coupling provided by the present invention, showing a tool applied thereto for breaking said joint. Fig. 15 is an enlarged detailed exploded perspective view showing a modified form of the present invention.

In accordance with the present invention the chassis or frame is particularly adapted for use in building electronic apparatus, such as radios, or the like. It is a feature of the present invention to provide for the building of various polygonal chassis, which are characterized, generally, by a top and a plurality of depending sides or rails. The chassis or frame may be of simple rectangular construction or it may be a modified rectangular construction, for example, any side or corner of the chassis may be indented or recessed as shown in Fig. 1 of the drawings. In practice, the elements provided by the present invention are manufactured in uniform modules, such as one inch, and it is conceivable that a chassis of almost any configuration can be built within practical size limits.

The chassis or frame provided by the present invention involves, generally, a plurality of like side rails A, coupling means B joining the side rails in end to end relationship, corner adapters C for modifying the configuration of the chassis, legs D for supporting the chassis, one or more panels E carried by the rails, and stiffeners S applied to and strengthening the panels E.

The rails A provided by the present invention are preferably elongate elements and are adapted to form the peripheral or marginal portions of the polygonal chassis or frame. It is a feature of this invention to provide a plurality of like rails A adapted to be joined end to end in order to form a continuous rail. Each rail involves a flat vertical wall 10 and spaced flanges 11 and 12. The wall 10 may be a simple panel of sheet metal, or the like, and may be provided with suitable stiffening means such as ribs or beads, not shown. The flanges 11 and 12 project from the upper and lower edges of the wall 10, respectively, and are inwardly turned and are preferably bent or deflected integral marginal continuations of the wall. The flanges 11 and 12 project from and are in a plane normal to the plane of the wall 10.

In practice, the rails A are coupled at the corners 13 of the frame and are ordinarily normal, or at right angles, to each other. Each rail A has a male end portion 14 and a female end portion 15. The flanges 11 and 12 are coextensive with the female end portion 15 but terminate at a point spaced from the end of the male portion 14, forming recesses 16. The relationship of parts just described is such that when the rails A are coupled one to another at right angles, the flanges 11 and 12 at the female end of one rail nest into the recesses 16 at the male end of the other rail. The flanges 11 and 12 are provided with uniformly spaced openings 17 for receiving fasteners, or the like, from the panel E as hereinafter described. The opening 17 may be of any suitable size or shape, as circumstances require, that is, they may be adapted to receive screws or rivets, or may be simple pilot holes.

The rails A carry the coupling means B which involves, generally, extensions or tongues X and tongue receivers Y carried by the male and female ends 14 and 15 of the rails, respectively. The coupling means B also includes retaining means Z, and is adapted to connect or join the rails A in end to end relationship and preferably at right angles to each other as shown throughout the drawings. However, it is feasible that the rails be joined end to end in longitudinal alignment with each other so that they, in effect, form one continuous rail. The tongues X are in the nature of projections 20 and are received by the receivers Y which are in the nature of recesses.

Each projection 20 is preferably a flat vertical and integral continuation of the wall 10, and is substantially coextensive with the vertical end portion of the wall. Each projection 20 has inner and outer faces 26 and 27, respectively, and has upper and lower edges 22 and 23 spaced from the upper and lower flanges 11 and 12 for purpose of clearance from the flanges on the female end portion 15. When rails A are to be coupled at an angle to each other the projection 20 is turned inwardly as by bending, as shown throughout the drawings, so that it projects laterally. When the rails A are to be coupled at right angles the projection 20 is turned inwardly in a plane normal to the plane of the wall 10, and the outer edge 24 of projection 20 is vertically disposed.

The receivers Y are preferably formed of elements which are integral with the end portions 15 of walls 10, and are adapted to receive the projections 20. Each receiver Y involves one or more sections 32 which are laterally offset from the plane of the wall 10. Sections 31 and 32 are preferably integral with the sheet material forming the wall 10, and, as show in the drawings, there are upper and lower sections 31 and an intermediate section 32. Section 32 is in the nature of a tab which is bent or deflected inwardly, preferably one metal thickness of the wall 10. Sections 31 have inner faces and section 32 has an outer face, the faces being engageable with the faces 26 and 27, respectively. The sections 31 and 32 are of sufficient longitudinal extent to adequately receive the projection 20. Horizontal slots 35 are made or cut in the female end portions of the rails and separate the sections 31 and 32. The section 31 has an end edge 33 which is in substantial alignment with the end of the rail A.

In practice, the rails are coupled together by means of the coupling means B which include the means X and Y.

In order to join two rails the projections 20 are inserted between the sections 31 and 32 so that the face 26 engages the inner faces of sections 31 and so that the face 27 engages the outer face of section 32. The upper and lower edges 22 and 23 of one rail clear the flanges 11 and 12 of the other rail. The flanges on one rail terminate at a point spaced from the end of that rail to clear the flanges of the other rail when the rails are coupled together.

The retaining means Z locks the tongues X in the receivers Y, and in the preferred form of the invention the means Z is a detent means and involves one or more lugs 40 on one rail engageable with one or more recesses 51 on the other rail. As shown, the lugs 40 are carried on the female portions 15 and the recesses 41 are carried on the male portions 14. In the preferred form of the invention there is one lug on each female portion and one recess in each male portion. As shown in the drawings, the lugs and recesses are elongate in form. Lug 40 of each means Z is an elongate, vertically disposed, raised portion which projects from the outer face of section 32, while the recess is an elongate, vertically disposed opening through the projection 20 and is adapted to receive the lug 40.

When the rails are coupled as above described the projections 20 and sections 32 are deflected as the parts are pressed together. When the parts reach their final assembled condition they spring back to a normal position so that the lugs 40 enter the recesses 41 thereby locking the rails together as a single unit.

Fig. 15 shows a modified form of the present invention in which there are two or more lugs $40^a$ on one rail engageable with two or more recesses $41^a$ on the other rail. As shown, there are two lugs $40^a$ and two recesses $41^a$ on each of the end portions $15^a$ and $14^a$ of the rails, respectively. The lugs $40^a$ project from the outer faces of portions $15^a$ and are engaged in the recesses $41^a$ through the inner faces $26^a$ of the projections $20^a$.

The corner adapter C, as provided by the present invention, may be used to alter or change the angular relationship of the rails. With the arrangement of parts above described the parts and elements are so related as to readily build a frame of simple rectangular configuration. However, when it is desired to modify the ordinary rectangular chassis configuration, for example, by removing a corner, such as is shown in Fig. 1 of the drawings, or by creating a recess in a side, it becomes necessary to provide means for changing or reversing the angular relationship of the rails. In other words, instead of an outside 90 degree corner it may be required to create an inside 90 degree corner. It is to be understood, however, that the corner may be of any degree or angle.

The adapter C is preferably a simple sheet metal part and involves, generally, a body 50, engageable with the projections 20 of the rails, and a projection 51. It is to be noted that the projection 51 is the equivalent of the projection 20 above described, and is engageable in the receivers Y. Body 50, as shown, is U-shaped, forming a channel 52 adapted to receive the projections 20 of the rails. The projections 20 are slidably received in the channel 52 and are substantially coextensive therewith. When adapter C is assembled with the rails, projection 51 extends laterally from the body 50 and projects laterally and outwardly from the outer side of the rail and is offset longitudinally and outwardly of the end of the rail to enter the receiver Y of the adjacent rail. The projection 51 extends or projects in a direction opposite the projection 20 of the rail upon which the adapter is secured.

A recess $41^b$, similar to the recess 41 of means Z, above described, is provided in the projection 51, and it receives the lug 40 in the receiver Y. Recess $41^b$ is formed by bending or deflecting an ear from the projection 51, which ear projects normal to the body to form a guide 52 for holding the projection 20 in the channel 52.

The legs D, as provided by the present invention, are preferably simple, formed sheet metal parts and act to support the chassis or frame and to join the corners of the chassis where the rails are coupled. Each leg D is a simple rectangular part 55 formed to match a corner of the chassis and is provided with a plurality of tabs 56 which register with the openings 17 hereinabove described. The tabs 56 are adapted to be bent or deflected to enter the openings 17 for securing the legs to the rails of the chassis. In place of the tabs 56 simple clearance holes may be provided for handling screws or rivets, or like fasteners. Each leg includes a vertical section 57 of suitable height and a pad joined thereto for engaging the ground or supporting surface. A pad 58 may be provided with a suitable rubber cushion, or the like, 58$^a$.

The panel E, as provided by the present invention, may be a simple sheet metal element of the selected size and, as shown in the drawings, there may be one or more top panels 60 and there may be identical bottom panels (not shown). For example, where the chassis is other than a simple rectangular chassis as shown in Fig. 1 of the drawings, the top may include a top panel 60$^a$. Suitably shaped panels may be selected, as required, to match the rail configuration which has been built. In practice, the margins of the panels may be reduced in a manner so that the panels do not overhang the rails.

The panels are provided with a plurality of uniformly spaced tabs 61 which coordinate and register with the openings 17 above described. Tabs 61 are adapted to be bent or deflected out of the plane of the panel so that they enter the openings 17 to secure the panel to the rails. However, it is contemplated that in place of the tabs 61 there may be simple clearance holes for receiving screws, rivets, or like fasteners, for the purpose of securing the panel to the rails.

The stiffeners S, as provided by the present invention, are adapted to join adjacent or abutting edges of the panels E as shown in Figs. 1 and 13. As shown, each stiffeners S may be a simple elongate sheet metal part, preferably in the form of an angle with a depending flange. The stiffener is provided with uniformly spaced openings 17$^a$ for receiving the tabs 61 or fasteners from the panels E.

In Fig. 14 of the drawings is shown a pair of rails A joined by coupling means B, and a tool T for breaking apart or separating the rails. As clearly illustrated in Figs. 9 and 14, the edges 24 of the projection 20 may be chamfered or undercut. The tool T has a hook part 65 engageable under the chamfered edge 24, and has a boss 66 engageable with the lug 40. When the handle 67 of the tool is moved in the direction of the arrow in Fig. 14, the tool depresses the lug and raises the edge, so that the tongue 20 and section 32 of the coupling means are deflected apart in a manner to unlock the rails.

From the foregoing description it will be apparent how a person desiring to build up a chassis or frame to meet his own particular requirements may select suitable parts as manufactured in accordance with the teaching of the present invention. These parts may be easily and quickly assembled to form a substantial and rugged chassis of the character described which is particularly suitable for the building of electronic equipment.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A chassis of the character described including, a plurality of like elongate rails having male and female end portions arranged in end to end relationship, and releasably coupling means at the ends of the rails including, a tongue projecting laterally from the end of the male portion, and a longitudinally outwardly opening receiver in the end of the female portion including, a section in the plane of the end and a section offset from the end, the tongue of the adjacent rail being slidably engaged between the sections.

2. A chassis of the character described including, a plurality of like elongate rails having male and female end portions arranged in end to end relationship, inwardly projecting horizontally disposed support flanges extending along the rails, uniformly spaced openings through the flanges, releasable coupling means at the ends of the rails including, a tongue projecting laterally from the end of the male portion, and a receiver in the end of the female portion and opening longitudinally outwardly and including, a section in the plane of the end and a section offset from the end, the tongue being slidably engaged between the sections, and a panel extending between the rails and engaged with the said flanges, the panel carrying uniformly spaced fasteners along its marginal portion secured to the flanges through the said openings.

3. A chassis of the character described including, a plurality of like elongate rails having male and female end portions arranged in end to end relationship, and releasable coupling means at the ends of the rails including, a tongue projecting laterally from the end of the male portion, a receiver in the end of the female portion and opening longitudinally outwardly and including, a section in the plane of the end and a section offset from the end, the tongue being slidably engaged between the sections, and releasably retaining means locking the tongue in the receiver including, a recess in the tongue and a lug on one of said sections and engaged in the recess.

4. A chassis of the character described including, a plurality of like elongate rails having male and female end portions arranged in end to end relationship, inwardly projecting, vertically spaced, horizontally disposed support flanges on the rails, releasable coupling means at the ends of the rails including, a tongue projecting laterally from the end of the male portion, and a longitudinally outwardly opening receiver in the end of the female portion and slidably receiving the tongue, the tongue slidably engaging the vertically spaced flanges and releasable retaining means locking the tongue in the receiver including, a detent having a recess in one end of one rail, a lug on the other end of the other rail and engaged in the recess, and a panel extending between the rails and secured to the flanges projecting therefrom.

5. A chassis of the character described including, a plurality of like elongate rails having male and female end portions arranged in end to end relationship, inwardly projecting horizontally disposed support flanges extending along the rails, uniformly spaced openings through the flanges, releasable coupling means at the ends of the rails including, a tongue projecting laterally from the end of the male portion, and a receiver in the end of the female portion and opening longitudinally outwardly therefrom and including, a section in the plane of the end and a section offset from the end, the tongue being releasably engaged between the sections, and a panel extending between the rails and engaged with the said flanges, the panel carrying uniformly spaced fasteners along its marginal portions secured to the support flanges through the said openings.

6. A chassis of the character described including, a plurality of like elongate rails having male and female end portions arranged in end to end relationship, inwardly projecting horizontally disposed, vertically spaced support flanges on the rails, releasable coupling means at the ends of the rails including, a tongue projecting laterally from the end of the male portion, and a receiver in the end of the female portion and opening longitudinally outwardly and slidably receiving the tongue, said tongue projecting between the flanges of the rail adjacent the receiver, retaining means releasably locking the tongue in the receiver including, projections on one end of the rails and recesses in the other end of the rails receiving the projections, and a panel extending between the rails and secured to the flanges projecting therefrom.

7. A chassis of the character described including, a plurality of like elongate rails having male and female end portions arranged in end to end relationship, inwardly projecting horizontally disposed, vertically spaced support flanges extending along the rails, uniformly spaced openings through the flanges, releasable coupling means at the ends of the rails including, a vertically disposed tongue projecting laterally from the end of the male portion, and a receiver in the end of the female portion and opening longitudinally outwardly therefrom and including a section in the plane of the end and a section offset from the end, said tongue slidably engaged between said sections, retaining means including, projections on the tongue engaged in recesses in the said offset section, and a panel extending between the rails and engaged with the said flanges, the panel carrying uniformly spaced fasteners along its marginal portions secured to the flanges through the said openings, the flanges on one rail engaging the opposite end of the tongue to prevent vertically shifting of the tongue in the receiver.

8. A chassis of the character described including, a plurality of like elongate rails having male and female end portions joined in end to end relationship, coupling means at the ends of the rails including, a tongue normal to and projecting laterally from the end of the male portion and a receiver in the end of the female portion and opening longitudinally outwardly, and an adapter between the ends of the rails including, a body portion engaged with the tongue of one rail, and a projection extending in a direction opposite of the tongue, the projection being engaged in the receiver of the other rail.

9. A chassis of the character described including, a plurality of like elongate rails having male and female end portions joined in end to end relationship, coupling means at the ends of the rails including, a tongue normal to and projecting laterally from the end of the male portion and a receiver in the end of the female portion and opening longitudinally outwardly, an adapter engaged between the ends of the rails including, a body portion engaged with the tongue of one rail, and a projection extending in a direction opposite of the tongue, the projection being engaged in the receiver of the other rail, and retaining means locking the projection in the receiver including, a detent having an element on the tongue engaged with an element on the receiver.

10. A chassis of the character described including, a plurality of like elongate rails having male and female end portions joined in end to end relationship, upper and lower inwardly projecting horizontally disposed flanges extending along the edges of the rails, coupling means at the ends of the rails including, a tongue normal to and projecting laterally from the end of the male portion, a receiver in the end of the female portion and opening longitudinally outwardly, an adapter engaged between the ends of the rails including, a body portion engaged with the tongue, a projection extending in a direction opposite of the tongue, the projection being engaged in the receiver, legs engaged with the lower flanges and carrying fasteners engaged therewith, panels extending between the rails and engaged with the upper flanges and secured thereto, and a stiffener joining and reinforcing adjacent and abutting edges of the panels.

References Cited in the file of this patent

UNITED STATES PATENTS

| | | |
|---|---|---|
| 1,150,455 | Rudolph et al. | Aug. 17, 1915 |
| 1,394,140 | Brown | Oct. 18, 1921 |
| 1,573,254 | Lachaine | Feb. 16, 1926 |
| 1,714,624 | Reeves | May 28, 1929 |
| 1,860,833 | Clayton | May 31, 1932 |
| 2,265,406 | Tautz | Dec. 9, 1941 |
| 2,290,713 | Sayles | July 21, 1942 |
| 2,611,460 | Nash | Sept. 23, 1952 |
| 2,627,948 | Farr | Feb. 10, 1953 |
| 2,740,428 | Swett | Apr. 3, 1956 |